(12) United States Patent
Jung et al.

(10) Patent No.: US 8,110,776 B2
(45) Date of Patent: Feb. 7, 2012

(54) GLASS SUBSTRATE CUTTING APPARATUS AND GLASS SUBSTRATE CUTTING SYSTEM USING THE SAME

(75) Inventors: Hun Sang Jung, Daejeon (KR); Hyung Sang Roh, Seoul (KR); Taeho Keem, Chungcheongnam-do (KR); Hun Sik Lee, Chungcheongnam-do (KR); Chang Ha Lee, Chungcheongnam-do (KR)

(73) Assignee: Samsung Corning Precision Materials Co., Ltd., Gumi-si (KR)

( * ) Notice: Subject to any disclaimer, the term of this patent is extended or adjusted under 35 U.S.C. 154(b) by 862 days.

(21) Appl. No.: 12/164,150

(22) Filed: Jun. 30, 2008

(65) Prior Publication Data

US 2009/0134135 A1 May 28, 2009

(30) Foreign Application Priority Data

Nov. 23, 2007 (KR) .................. 10-2007-0120109

(51) Int. Cl.
*C03B 33/02* (2006.01)
*C03B 33/10* (2006.01)
(52) U.S. Cl. ......... 219/121.68; 219/121.76; 219/121.82; 225/96.5
(58) Field of Classification Search .......... 219/121.67–121.69, 121.72, 121.76, 219/121.82; 225/2, 96.5; 65/56, 174
See application file for complete search history.

(56) References Cited

U.S. PATENT DOCUMENTS

| 3,216,635 A | | 11/1965 | Lefevre | |
|---|---|---|---|---|
| 3,453,097 A | * | 7/1969 | Hafner | 65/112 |
| 3,716,176 A | * | 2/1973 | Yamada et al. | 225/96.5 |
| 3,744,697 A | * | 7/1973 | Jacquot et al. | 228/5.1 |
| 3,935,419 A | * | 1/1976 | Lambert et al. | 219/121.67 |
| 4,794,963 A | * | 1/1989 | Oppeneer | 144/358 |
| 4,904,294 A | * | 2/1990 | Schultz et al. | 65/106 |
| 4,948,025 A | | 8/1990 | Lisec | |
| 5,826,772 A | * | 10/1998 | Ariglio et al. | 225/2 |
| 5,871,134 A | * | 2/1999 | Komagata et al. | 225/2 |
| 5,873,773 A | | 2/1999 | Bando | |
| 6,238,516 B1 | * | 5/2001 | Watson et al. | 162/8 |
| 6,407,360 B1 | * | 6/2002 | Choo et al. | 219/121.67 |
| 6,603,533 B2 | * | 8/2003 | Go | 355/71 |
| 7,726,532 B2 | * | 6/2010 | Gonoe | 225/1 |
| 2004/0040997 A1 | * | 3/2004 | Ueyama et al. | 225/96.5 |
| 2009/0188960 A1 | * | 7/2009 | Lee et al. | 225/96.5 |

FOREIGN PATENT DOCUMENTS

| EP | 1862280 A1 | | 5/2007 |
|---|---|---|---|
| JP | 62046930 A | * | 2/1987 |
| JP | 09108875 A | * | 4/1997 |

* cited by examiner

*Primary Examiner* — Samuel M Heinrich
(74) *Attorney, Agent, or Firm* — Stein McEwen, LLP

(57) ABSTRACT

Glass substrate cutting apparatuses using lasers are disclosed, where a laser cutting head is moved. A glass substrate cutting apparatus includes two parts for a laser cutting head: heavy laser beam generators fixed to respective ends of a gantry structure moving in parallel along two gantry stages located on either side of a cutting table, and relatively lightweight laser irradiation heads moving horizontally in parallel with the gantry structure. The glass substrate cutting apparatus includes a cutting table for maintaining a glass substrate in a horizontal state; biaxial gantry stages for moving a gantry structure along the cutting table; the gantry structure moving in between an upper part of the biaxial gantry stages; laser beam generators fixed to respective ends of the gantry structure for oscillating the laser; and laser irradiation heads that move horizontally on respective ends of the gantry structure and irradiate the laser upon the glass substrate.

11 Claims, 4 Drawing Sheets

GLASS SUBSTRATE CUTTING APPARATUS AND GLASS SUBSTRATE CUTTING SYSTEM USING THE SAME

BACKGROUND

1. Technical Field

The present disclosure generally relates to a glass substrate cutting apparatus using a laser, and more specifically, to a glass substrate cutting apparatus using a laser, where a gantry structure moves while uniformly maintaining a relative position by using gantry stages installed on right and left sides of a cutting table in parallel. The glass substrate cutting apparatus includes two parts for a laser cutting head: laser beam generators, each including a heavy-weighted laser oscillation source and a power supply part, fixed to respective ends of the gantry structure, and laser irradiation heads, each including a beam delivery system, a beam shaping lens, a quenching nozzle, and an initial cracker, which are relatively lightweight units, moving horizontally along the gantry structure. As described above, since the laser cutting head is separated into two parts, the gantry structure resists sinking even in case of location movement of a load, and it is possible to minimize deterioration of stability and a cutting degree caused by positional distortion of a laser beam path owing to sinking of the gantry structure.

2. Background

Prior art methods for cutting a glass substrate include a scribe wheel method. The scribe wheel method is a method for installing fine diamonds on a circumferential surface of a disk having a predetermined diameter, and for forming a scribe line of predetermined depth on a surface of the glass substrate by contacting the diamonds with a prearranged cutting line to be cut by rotating the installed diamonds at high speed. That is, the scribe wheel method refers to a method for cutting the glass substrate by propagating cracks to the substrate along the scribe line after applying physical shock to the glass substrate where the scribe line is formed. However, the scribe wheel method needs cutting margins of at least a certain size. Moreover, a separate cleaning process and drying process are essential to remove particles generated during a cutting process. Also, cut sections are not smooth and a cost of expendables is increased.

To overcome such disadvantages, glass substrate cutting apparatuses using lasers have been used. In prior art glass substrate cutting apparatuses using lasers, a cutting table on which a glass substrate is located has been moved in a cutting direction while maintaining a laser cutting head in a fixed state. Fixed placement of the laser cutting head in such systems has been required because precise control of the cutting head is difficult due to a load of the laser cutting head if the laser cutting head moves, since laser beam generators are heavy. The laser beam generators have a load of approximately 250 kg to 300 kg. Thus, if this load moves, a structure which supports the laser cutting head may sink, resulting in positional distortion of a path of a laser beam and deterioration of a cutting degree and stability.

Prior art glass substrate cutting apparatuses using lasers do not move the laser cutting head during a cutting process, which can magnify cutting stability. In such systems, a cutting table is moved instead. As a result, a layout area for installing the cutting table is large and a significant amount of time is required to return the cutting table to the original position. As such, productivity is reduced because of an increase in cycle time.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "laser" is a reference to one or more lasers and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

It is therefore an object of the present disclosure to provide a glass substrate cutting apparatus using a laser that does not include the disadvantages of a separate cleaning and drying processes to remove particles generated by cutting, cut sections that are not smooth, and an increased cost of expendables, such as when the prior art scribe wheel method is used Also, it is another object of the present disclosure to provide an apparatus for cutting glass by moving a laser cutting head without solely using the prior art table transferring method, providing a glass substrate cutting apparatus using a laser that reduces a layout space compared to the table transferring method, and shortening a cycle time by omitting time necessary for returning a cutting table to the original position.

Furthermore, it is another object of the present disclosure to provide a glass substrate cutting apparatus using a laser for separating a laser cutting head into two parts including laser beam generators and laser irradiation heads. Each laser beam generator is composed of a heavy-weighted laser power supply part and a laser oscillation source fixed to one end of a gantry structure that moves along biaxial gantry stages. Components other than the laser power supply part and the laser oscillation source move horizontally along the gantry structure as the laser irradiation heads. Therefore, the present disclosure provides a glass substrate cutting apparatus using a laser for overcoming stability and precision problems as well as avoiding a cutting angle that may deteriorate owing to positional distortion of a laser beam path when the gantry structure sinks by weight of the laser cutting head if the head moves as one body.

In order to accomplish the above object, a glass substrate cutting apparatus using a laser in accordance with an embodiment, comprising: a cutting table (120) for maintaining a glass substrate to be cut in horizontal state; one pair of gantry stages (50) installed in parallel on respective ends of the cutting table (120), so as to move a gantry structure (60) along the cutting table (120); the gantry structure (60) installed to move laser beam generators (100) and laser irradiation heads (110) along the gantry stages (50) by being vertically put in an upper part of the gantry stages (50); the laser beam generators (100) fixed to an upper part on respective ends of the gantry structure (60), and including a laser oscillation source and a power supply part; and the laser irradiation heads (110) installed to horizontally move along the gantry structure (60) on respective ends of the gantry structure (60), including a beam delivery system, a beam shaping lens, a quenching nozzle, an initial cracker, and an irradiating laser configured to oscillate from the laser beam generators (100) upon the glass substrate.

A laser cutting apparatus using a prior table transferring method required approximately 15 m of a layout space. In contrast, a laser irradiation head moving-type glass substrate cutting apparatus using a laser as discussed herein may have a layout size of about ⅔ such size (i.e., approximately 10 m of layout space). The laser cutting apparatus using the prior table transferring method essentially has a process of returning a cutting table to the original position. However, the glass substrate cutting apparatus using a laser as described herein can omit time taken for returning the cutting table to the original position, thereby remarkably reducing cycle time and increasing throughput.

In addition, a glass substrate cutting apparatus using a laser in accordance with an embodiment includes a laser cutting head having laser beam generators composed of a heavy-weighted laser oscillation source and a power supply part, and laser irradiation heads of relatively lighter weight than the laser beam generators. Accordingly, a method for separating the laser cutting head into the two parts has been applied by fixing the laser beam generators to respective ends of a gantry structure and horizontally moving the laser irradiation heads along the gantry structure.

Therefore, it is possible to prevent the gantry structure from sinking due to weight of the laser beam generators, by applying the method of separating the laser cutting head into the two parts such as the laser beam generators fixed to respective ends of the gantry structure and the laser irradiation heads movable along the gantry structure, thereby minimizing positional distortion of a laser beam path. As a result, deterioration of cutting accuracy and stability can be avoided.

Furthermore, for a glass substrate cutting apparatus using a laser in accordance with an embodiment, right and left sides of the glass substrate are primarily cut by sequentially disposing glass substrate cutting apparatuses using a laser and adding a rotating device of the glass substrate between the glass substrate cutting apparatuses using a laser, then the cut right and left sides are rotated to secondarily cut upper and lower sides of the glass substrate through consecutive processes.

When the glass substrate is rotated 90° by the rotating device to secondarily cut the upper and lower sides after primarily cutting the right and left sides of the glass substrate, prior art methods have been used to rotate the glass substrate by absorbing the glass substrate in a vacuum, in an upper part of the glass substrate. But, the prior art absorptive rotating method may cause foreign substances to be collected on an absorbing surface of the glass substrate, causing damage to the glass substrate. In an embodiment disclosed herein, a rotating device of the glass substrate cutting apparatus using a laser comprises conveyers for connecting a plurality of driving rollers installed to vertically move by using conveyer belts, a flat board grating for rotating the glass substrate by 90°, and a turntable. And, it reduces the possibility of damage to the glass substrate and of collection of foreign substances on the absorbing surface by rotating the flat board grating where the glass substrate is put in an upper part by using the turntable.

A glass substrate cutting apparatus using a laser in accordance with an embodiment primarily rotates the cut glass substrate 90° by using the rotating device, and secondarily cuts the upper and lower sides of the glass substrate. In the above processes, images on cut sections of the primarily cut glass substrate are obtained by using cameras installed on a front side of the gantry structure. In addition to the cameras installed on the front side of the gantry structure, errors can be minimized through a plurality of cameras by additionally installing the cameras within the laser irradiation heads, and more exactly, a secondary cutting process can be performed on the basis of a surface vertical to a primarily cut surface, thereby increasing the squareness of the cut surface.

The present embodiments have a superior effect when cutting, for example, display glass, which requires high precision. Display glass may include glass used for display devices such as liquid crystal displays, plasma displays, and organic EL displays.

BRIEF DESCRIPTION OF THE DRAWINGS

The advantages of the embodiments disclosed herein will become readily apparent to those skilled in the art from the following detailed description of a preferred embodiment when considered in the light of the accompanying drawings, in which.

DETAILED DESCRIPTION

Figure 1:
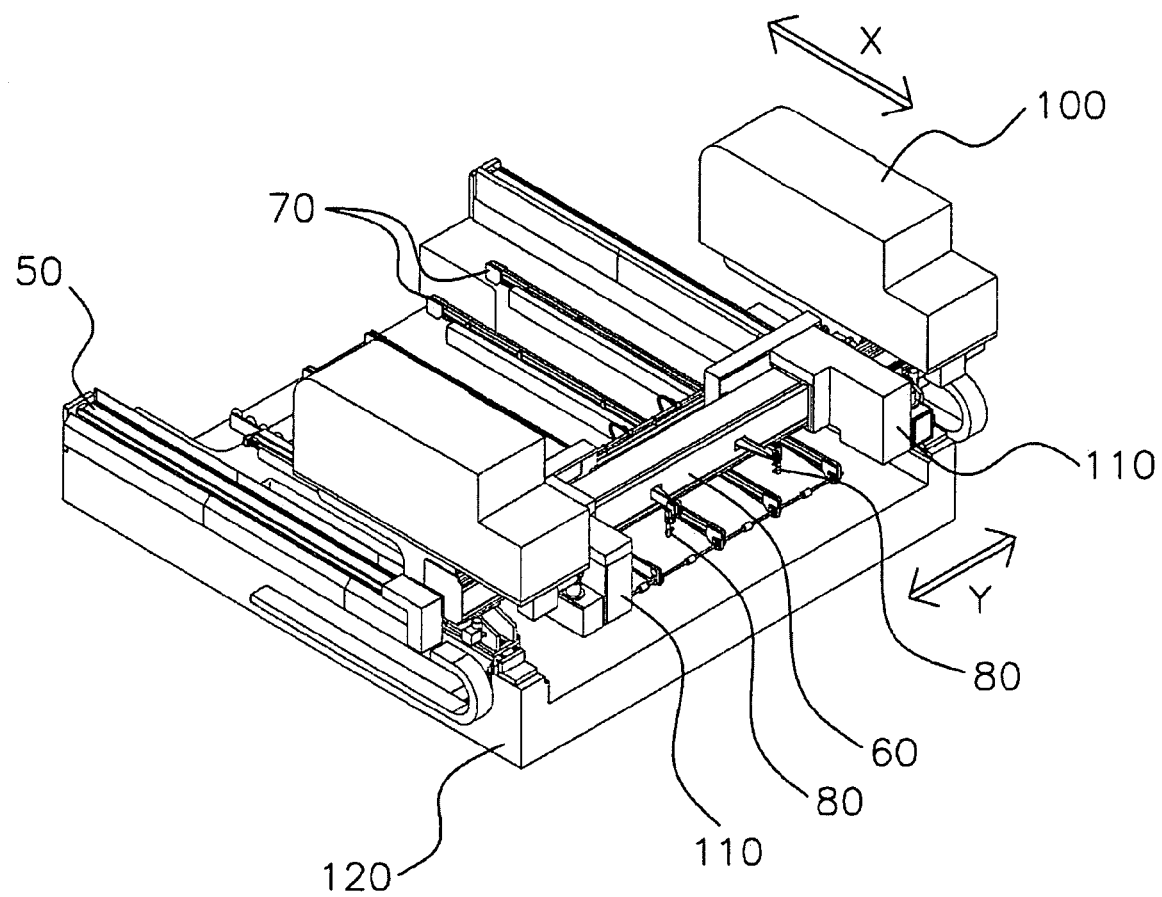
FIG. 1 is a perspective view generally illustrating a configuration of a glass substrate cutting apparatus using a laser in accordance with an embodiment.

FIG. 1 is a perspective view generally illustrating a configuration of a glass substrate cutting apparatus using a laser in accordance with an embodiment, and FIGS. 2(a) and 2(b) show a side view of a glass substrate cutting apparatus using a laser indicative of a process that a gantry structure moves along gantry stages and a front view of a glass substrate cutting apparatus using a laser indicative of a figure that laser irradiation heads move along the gantry structure.

Figure 2:
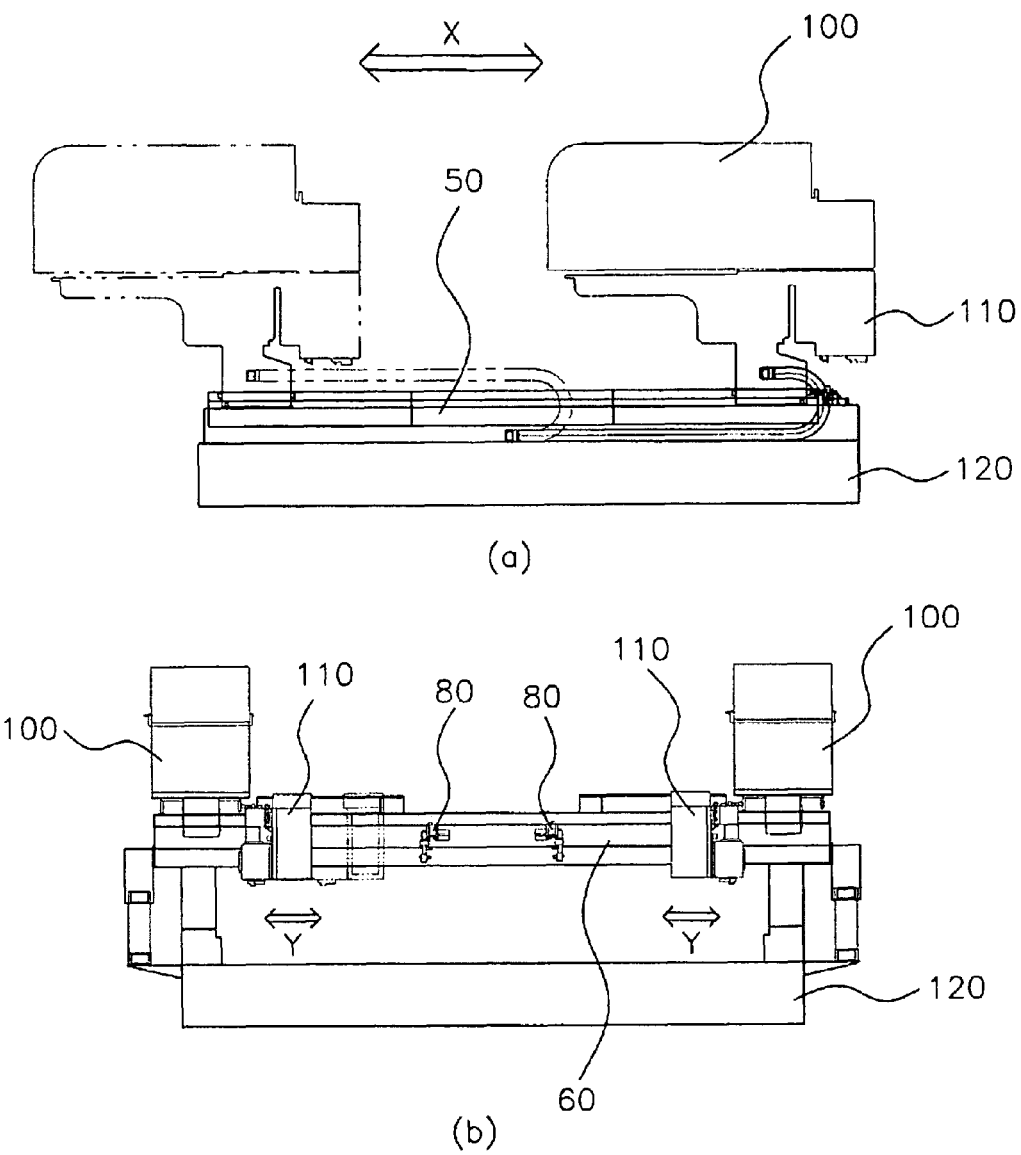
FIG. 2(a) shows a side view of a glass substrate cutting apparatus using a laser indicative of a process that a gantry structure moves along gantry stages.
FIG. 2(b) shows a front view of a glass substrate cutting apparatus using a laser indicative of a figure that laser irradiation heads move along the gantry structure.

Referring to FIG. 1 and FIG. 2, a glass substrate cutting apparatus using a laser in accordance with an embodiment may include: a cutting table (120) for maintaining a glass substrate to be cut in horizontal state; a pair of gantry stages (50) installed in parallel on respective ends of the cutting table (120), so as to move a gantry structure (60); the gantry structure (60) installed to move along the gantry stages (50) by being vertically installed with the gantry stages (50) in an upper part of the gantry stages (50); laser beam generators (100) fixed to respective ends of the gantry structure (60); and laser irradiation heads (110) installed to horizontally move along the gantry structure (60) on respective ends, and an irradiating laser oscillated from the laser beam generators (100) upon the glass substrate.

The cutting table (120) is composed of conveyers (70) for receiving or discharging the glass substrate. The glass substrate received by the cutting table (120) via the conveyers (70) is maintained in a horizontal state by the cutting table (120).

The gantry structure (60) moves in an X-axis direction along the gantry stages (50). The gantry stages (50) are installed in parallel with each other on the right and left sides of the cutting table (120), and include linear guides in order to freely transfer the gantry structure (60) in the X-axis direction. Namely, supposing that an X axis is parallel to the gantry stages (50) while a Y axis is parallel to the gantry structure (60) in an orthogonal X-Y coordinate system, the gantry stages (50) may include an X-axis linear guide for moving the gantry structure (60) forward and backward in the X-axis direction.

The gantry structure (60) moves along the gantry stages (50) by being vertically installed within the gantry stages (50) and is positioned in an upper part of the gantry stages (50) in accordance with an embodiment. The gantry structure (60) includes a Y-axis linear guide for moving the laser irradiation heads (110) horizontally in a front part.

The laser beam generators (100) are fixed to an upper part of the respective ends of the gantry structure (60). The laser beam generators (100) each include a laser oscillation source and a power supply part, and have heavy-loaded units among laser cutting head components. As such, while the laser beam generators (100) are fixed to the upper part of respective ends of the gantry structure (60), if the gantry structure (60) moves in the X-axis direction along the gantry stages (50), the laser beam generators move forward or backward in the X-axis direction together with the gantry structure (60).

The laser irradiation heads (110) are installed on respective ends of the gantry structure (60) of the glass substrate cutting apparatus using a laser in accordance with an embodiment. The laser irradiation heads (110) are configured to horizontally move on the respective ends of the gantry structure (60) along the Y-axis linear guide installed in the front part of the gantry structure (60). The laser irradiation heads (110) include light-loaded units compared to the laser beam generators (100) composed of the laser oscillation source and the power supply part. In an embodiment, the laser irradiation heads (110) comprise a beam delivery system which includes a reflecting unit for sending a laser beam oscillated by the laser beam generators (100), a beam shaping lens for condensing the laser beam, a quenching nozzle for spraying cooling mist along a cut line heated by the laser beam, and an initial cracker for providing an initial crack on a glass surface.

In a cutting process of the glass substrate cutting apparatus using a laser in accordance with an embodiment, the glass substrate is received the cutting table (120) via the conveyers (70) installed on the cutting table (120). The received glass substrate is maintained in a horizontal state within the cutting table (120). After the glass substrate is fixed in the horizontal state within the cutting table (120), the laser irradiation heads (110) installed on the respective ends of the gantry structure (60) control a cutting width of the glass substrate by moving horizontally along the Y-axis linear guide disposed on the front side of the gantry structure (60). For instance, if 50 inch LCD glass and 40 inch LCD glass are cut, cutting widths are controlled since the cutting widths are different from each other. The laser irradiation heads (110) installed on respective ends of the gantry structure (60) move in a Y-axis direction in an upper part of the respective ends of the gantry structure (60), to control the cutting width of the glass substrate to be cut.

The laser beam generators (100) are fixed to the upper part of the respective ends of the gantry structure (60). The laser beam generators (100) have a very high load by including the laser oscillation source and the power supply part. As a result, if the laser cutting head moves as one body in order to control the cutting width of the glass substrate, that is to say, if the laser beam generators (100) and the laser irradiation heads (110) simultaneously move in right and left directions of the gantry structure (60), the gantry structure (60) may sink owing to weight of the laser beam generators and the laser irradiation heads. When the gantry structure (60) sinks, a position of a cutting path of a laser beam is distorted, deteriorating cutting accuracy and stability.

Accordingly, the laser cutting head may be separated into two parts such as the relatively high-loaded laser beam generators (100) fixed to the upper part of the respective ends of the gantry structure (60) and the laser irradiation heads (110) horizontally movable in the Y-axis direction so as to control the cutting width of the glass substrate, thereby minimizing positional distortion of a laser beam path.

After the laser irradiation heads (110) move horizontally to control the cutting width of the glass substrate, the laser beam is irradiated on the glass substrate to conduct a cutting process of the glass substrate by moving the gantry structure (60) in X-axis direction. The laser beam oscillated by the laser beam generators (100) is induced to the laser irradiation heads (110), so that the laser beam is irradiated on the glass substrate. The laser beam is induced by a mirror through the beam delivery system within the laser irradiation heads (110). As for properties of the laser beam having fixed wavelength, there is almost no loss of the laser beam in accordance with induction of the laser beam through reflection by the mirror.

After the laser beam oscillated by the laser beam generators (100) is induced to the laser irradiation heads (110) through the beam delivery system, the laser beam is irradiated on a glass surface. As soon as the laser beam is irradiated, the gantry structure (60) located in the upper part of the respective ends of the gantry stages (50) moves in the X-axis direction along the gantry stages (50) to rapidly heat the right and left sides of the glass substrate at the same time. Then, a cooling mist having a significantly lower temperature than a heating temperature of the glass substrate is sprayed through the quenching nozzle within the laser irradiation heads (110) along the right and left sides of the glass substrate rapidly heated by the laser beam. Consequently, as the glass substrate is rapidly cooled off, a crack of predetermined depth is generated on a surface of the glass substrate to form a scribe line.

Figure 3:
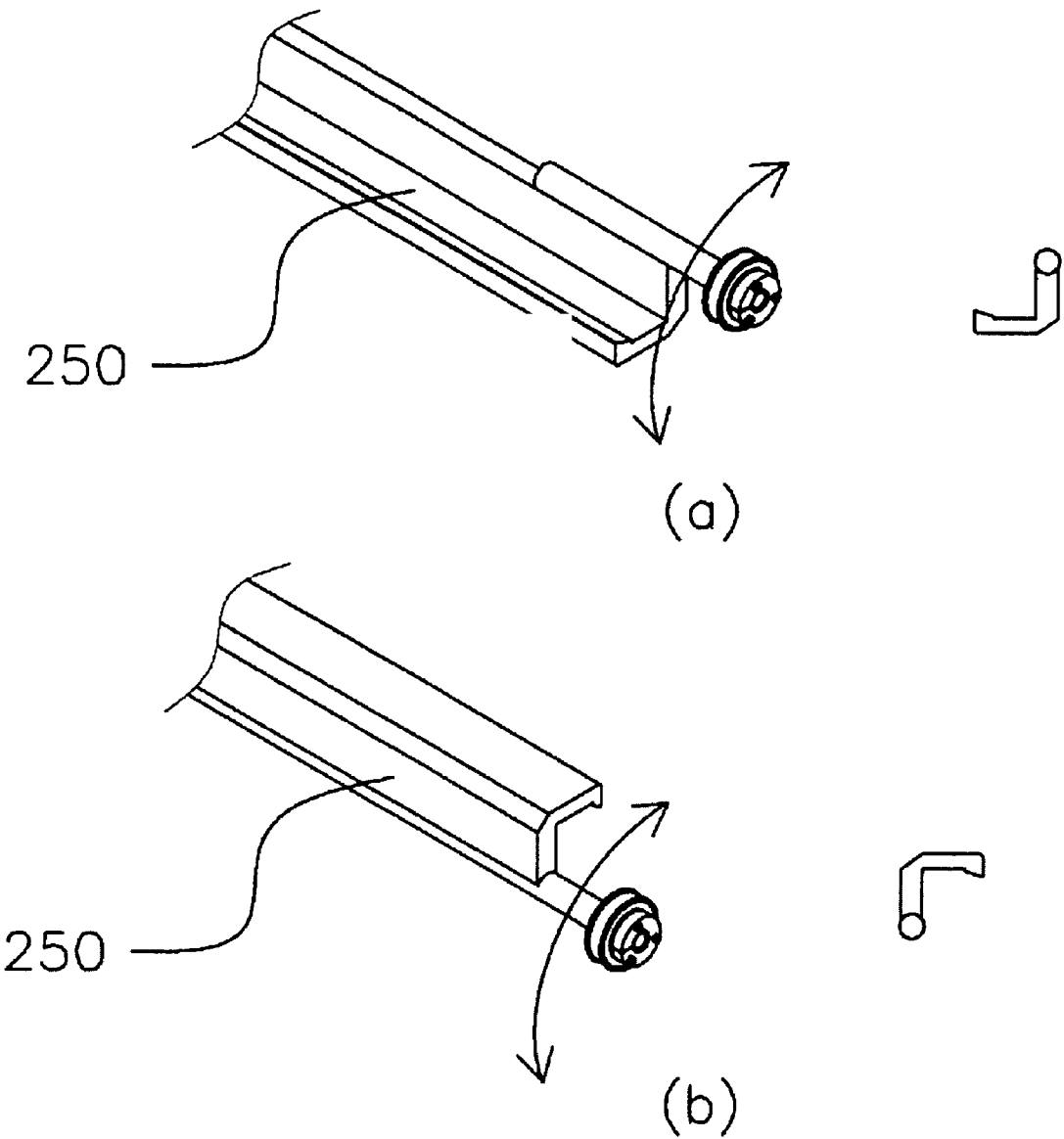
FIG. 3 is a perspective view illustrating cutting devices installed on sides of a glass substrate cutting apparatus using a laser in accordance with an embodiment.

FIG. 3 is a perspective view and a sectional view illustrating cutting devices installed on right and left sides of a cutting table of a glass substrate cutting apparatus using a laser in accordance with an embodiment and sections of the cutting devices.

Referring to FIG. 3, the glass substrate cutting apparatus using a laser in accordance with an embodiment comprises cutting devices (250) for pressurizing and cutting a glass substrate where a scribe line is formed by a laser beam, in both side portions of a cutting table (120).

To cut the glass substrate, a separate cutting process is essential after a process of forming the scribe line of the glass substrate is performed. In the prior art cutting table transferring method, a scribing process was conducted by moving a cutting table, and a method was used to pressurize and cut the glass substrate by dropping an oblong bar shape in an upper direction along the scribe line on the glass substrate where the scribe line was formed. As such the layout area had to be expanded.

Though positions of the cutting devices are not shown in the drawings, the cutting devices are installed on right and left sides in parallel with the gantry stages (50) on the inner side of the gantry stages (50) equipped in the respective side portions of the cutting table (120). The cutting devices are disposed in spaces between the laser irradiation heads (110) and the gantry stages (50) on the inner side along the gantry stages (50) of FIG. 1.

When the glass substrate is received at the cutting table (120) via the conveyers (70), the cutting devices (250) installed on both sides of the cutting table (120) fix the received glass substrate to be cut on both sides. After the laser beam is irradiated on the glass substrate, the cutting devices (250) installed on the right and left sides of the cutting table (120) rotate using the X axis as a rotational axis, and upper parts of the cutting devices pressurize a cut section of the glass substrate in an upper part to cut the pressurized substrate.

Embodiments disclosed herein do not require a separate layout area that is required by the prior art table transferring method. Rather embodiments utilize the cutting devices (250) on the right and left sides of the cutting table (120), and can pressurize and cut the glass substrate where the scribe line is formed by the laser beam within the cutting table (120).

Figure 4:
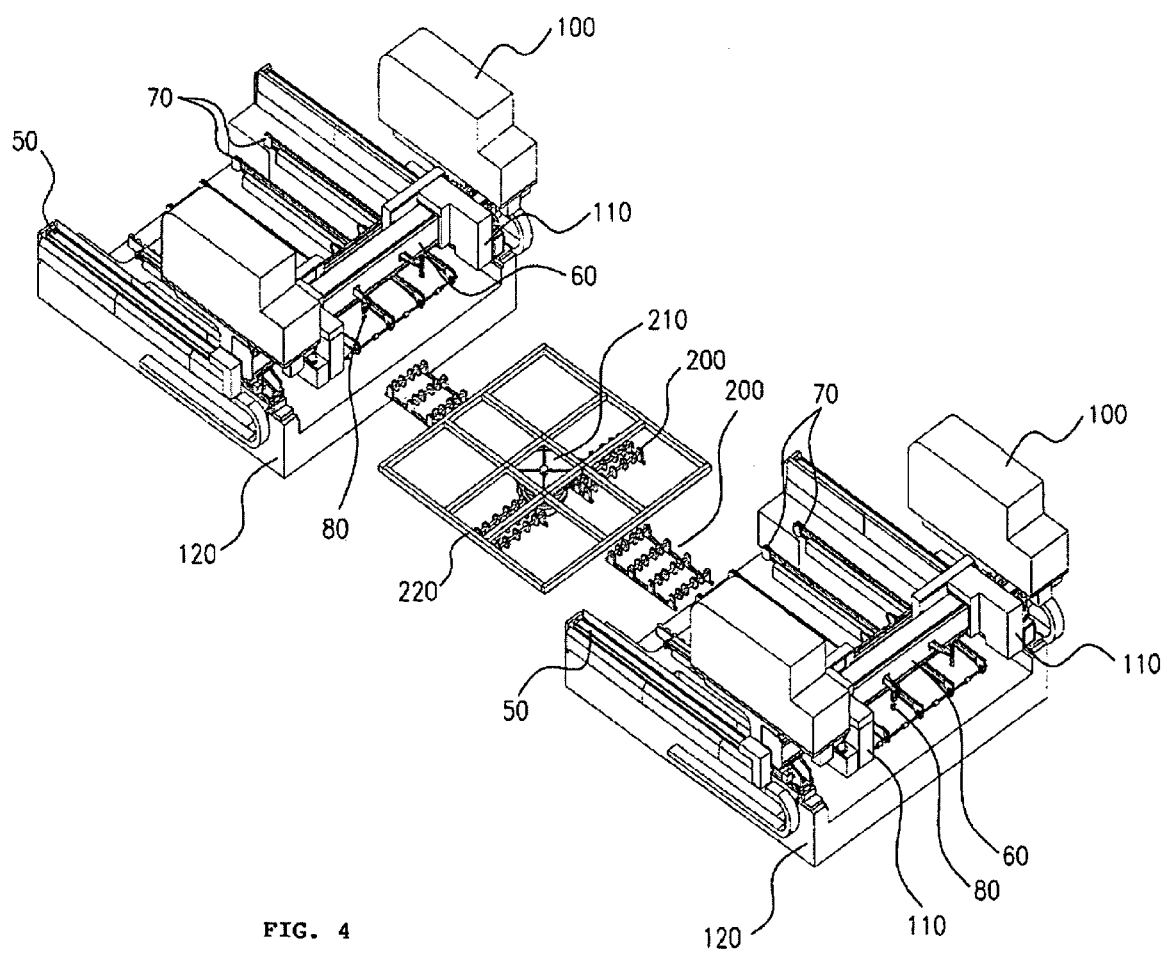
FIG. 4 is a perspective view illustrating a glass substrate cutting apparatus using a laser for sequentially disposing glass substrate cutting apparatuses using a laser according to an embodiment, and for including a rotating device of the glass substrate between the glass substrate cutting apparatuses.

FIG. 4 is a perspective view illustrating a glass substrate cutting system using a laser for sequentially disposing glass substrate cutting apparatuses using a laser according to an embodiment, and for including a rotating device that rotates the glass substrate between the glass substrate cutting apparatuses.

Referring to FIG. 4, the glass substrate cutting system using a laser in accordance with an embodiment comprises a primary glass substrate cutting apparatus (300) using a laser for primarily cutting right and left sides of a glass substrate by moving a gantry structure (60) along one pair of gantry stages (50) installed on right and left sides of a cutting table (120) in parallel, a rotating device for rotating the primarily cut glass substrate 90°, and a secondary glass substrate cutting apparatus (400) using a laser for cutting upper and lower sides vertical to the right and left sides of the primarily cut glass substrate.

By the primary glass substrate cutting apparatus (300) using a laser, the right and left sides of the glass substrate are primarily cut at the same time, and the primarily cut glass substrate is rotated 90° by the rotating device, so that a secondary cutting process is conducted after the glass substrate is vertically aligned on a primarily cut surface by the secondary glass substrate cutting apparatus (400) using a laser.

The rotating device in accordance with an embodiment includes conveyers (not shown) including driving rollers (200) installed to vertically move and conveyer belts (not shown) for connecting the driving rollers (200), a flat board grating (220) for rotating the glass substrate received by the conveyers by 90°, and a turntable (210).

In the prior art, a method for rotating the glass substrate 90° by lifting up the substrate after absorbing the glass substrate in a vacuum in an upper part was used, so as to rotate the glass substrate. The prior art glass substrate rotating method can cause the generation of a foreign substance on an absorptive surface of the upper part of the glass substrates and a surface of the glass substrate can be damaged. In contrast, rotating devices disclosed herein prevent damage to the surface of the glass substrate by using the flat board grating (220) to support the glass substrate in a lower part and a turntable (210) for rotating the grating.

The glass substrate whose right and left sides are primarily cut by the primary glass substrate cutting apparatus (300) using a laser in accordance with an embodiment is moved to the rotating device via the conveyers (70). The glass substrate moved to the rotating device is located in an upper part of the flat board grating (220) by the conveyers located within the rotating device. The conveyers include the driving rollers (200) which can be moved up and down and conveyer belts for connecting the driving rollers (200). After the glass substrate is positioned in the upper part of the flat board grating (220) by the conveyers, the driving rollers (200) and the conveyers are moved down to set the glass substrate on the flat board grating (220), and the glass substrate is rotated, for example, 90-degrees using the turntable (210). Then, the driving rollers (200) and the conveyers are moved up again to discharge the rotated glass substrate to the secondary glass substrate cutting apparatus (400).

Referring to FIG. 1 through FIG. 4, the glass substrate cutting apparatus using a laser in accordance with an embodiment may include cameras (80) for obtaining images of cut sections of the primarily cut glass substrate in a front part of the gantry structure (60).

Right and left sides of the glass substrate are cut by the primary glass substrate cutting apparatus (300), and the glass substrate rotated 90° by the rotating device is moved to the secondary glass substrate cutting apparatus (400) by the conveyers (70). A primarily cut surface of the glass substrate rotated 90° by the rotating device is located in parallel with a Y axis of the gantry structure (60) of the secondary glass substrate cutting apparatus. At this point, a sectional alignment state of the glass substrate is confirmed by obtaining an image of a section of the primarily cut glass substrate through the cameras (80) installed in the front part of the gantry structure (60), and based on the confirmed state, the glass substrate is aligned. Likewise, in addition to the cameras (80) located on a front side of the gantry structure (60), cameras can be additionally installed within the laser irradiation heads (110), and in this case, it is available to minimize errors by using the plurality of the cameras (80), and to more exactly perform a secondary cutting process on a vertical surface on the basis of the primarily cut surface.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A glass substrate cutting apparatus for cutting a glass substrate by irradiating a laser beam on the glass substrate and moving the laser beam while the glass substrate is static, comprising:
   a cutting table configured to maintain the glass substrate in a horizontal state;
   a pair of gantry stages installed on right and left sides of the cutting table in parallel;
   a gantry structure installed on the gantry stages to move forward and backward along the gantry stages;
   laser beam generators fixed to an upper part of the gantry structure;
   laser irradiation heads configured to move horizontally along the gantry structure and to irradiate upon the glass substrate laser beams generated by the laser beam generators; and
   cutting devices installed on the right and left sides of the cutting table in parallel with the gantry stages on inner sides of the gantry stages, the cutting devices being configured to press and cut the glass substrate.

2. The apparatus of claim 1, wherein the cutting table comprises conveyers for moving the glass substrate within the cutting table, wherein the cutting devices are disposed in spaces between the laser beam generators and the gantry stages on the inner sides along the gantry stages, and rotate about a rotational axis, wherein upper parts of the cutting devices are configured to press a cut section of the glass substrate to cut the glass substrate.

3. The apparatus of claim 1, wherein each gantry stage includes a linear guide for enabling the gantry structure to move forward or backward in parallel in an upper part.

4. The apparatus of claim 1, wherein the gantry structure includes one or more cameras installed in a front part of the gantry structure for positional alignment of the gantry structure and a sectional alignment state of the glass substrate received by the cutting table.

5. The apparatus of claim 1, wherein each laser beam generator includes a laser oscillation source and a power supply unit fixed to an upper part of a respective end of the gantry structure.

6. The apparatus of claim 1, wherein the laser beam irradiation heads are installed to move horizontally along the linear guides.

7. The apparatus of claim 6, wherein the laser beam irradiation heads comprise;
a beam delivery system including a reflecting unit for reflecting the laser beam irradiated from the laser beam generators;
an initial cracker for providing an initial crack to a glass surface;
a beam shaping lens for condensing a laser beam delivered from the beam delivery system; and
a quenching nozzle for spraying a cooling mist according to the laser beam irradiated from the beam shaping lens.

8. The apparatus of claim 1, wherein the laser beam irradiation heads comprise:
a beam delivery system including a reflecting unit for reflecting the laser beam irradiated from the laser beam generators;
an initial cracker for providing an initial crack to a glass surface;
a beam shaping lens for condensing a laser beam delivered from the beam delivery system; and
a quenching nozzle for spraying a cooling mist according to the laser beam irradiated from the beam shaping lens.

9. A glass substrate cutting system, comprising:
a first glass substrate cutting apparatus according to claim 1;
a second glass substrate cutting apparatus according to claim 1; and
a glass substrate rotating device installed between the first and second glass substrate cutting apparatuses, wherein the glass substrate rotating device is configured to rotate a glass substrate after being primarily cut by a first glass substrate cutting apparatus using the first laser and prior to being secondarily cut by the second glass substrate cutting apparatus using the second laser.

10. The system of claim 9, wherein the glass substrate rotating device comprises:
one or more conveyers for receiving the primarily cut glass substrate and for discharging the glass substrate rotated by 90°;
a flat board grating for supporting the glass substrate received by the one or more conveyers in a lower part; and
a turntable for rotating the flat board grating by 90°.

11. The system of claim 10, wherein the conveyers comprise:
a plurality of driving rollers configured to move up and down; and
one or more conveyer belts for connecting the driving rollers.

* * * * *